H. LEE.
Cotton Stalk-Pullers.
No. 167,105. Patented Aug. 24, 1875.
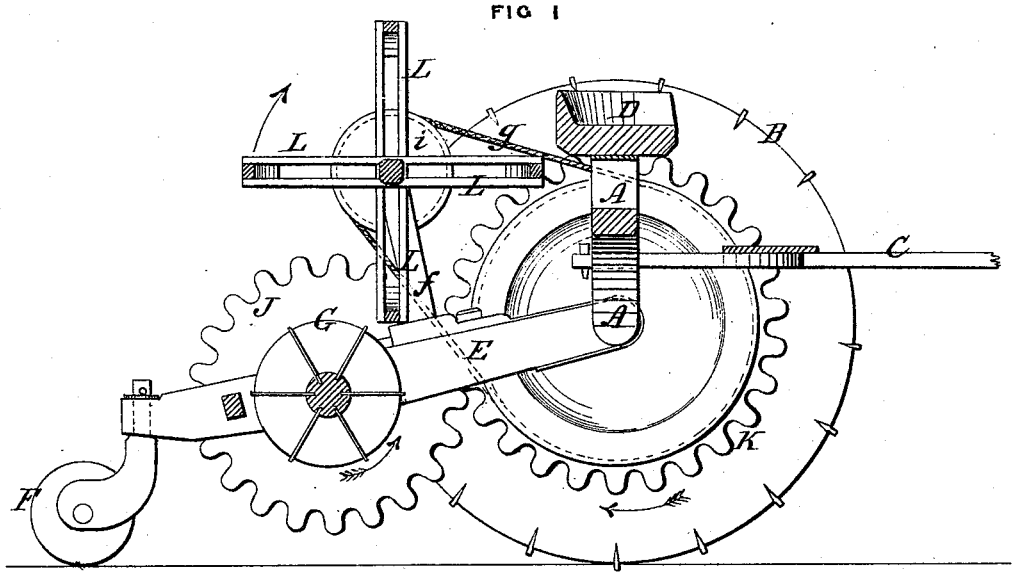
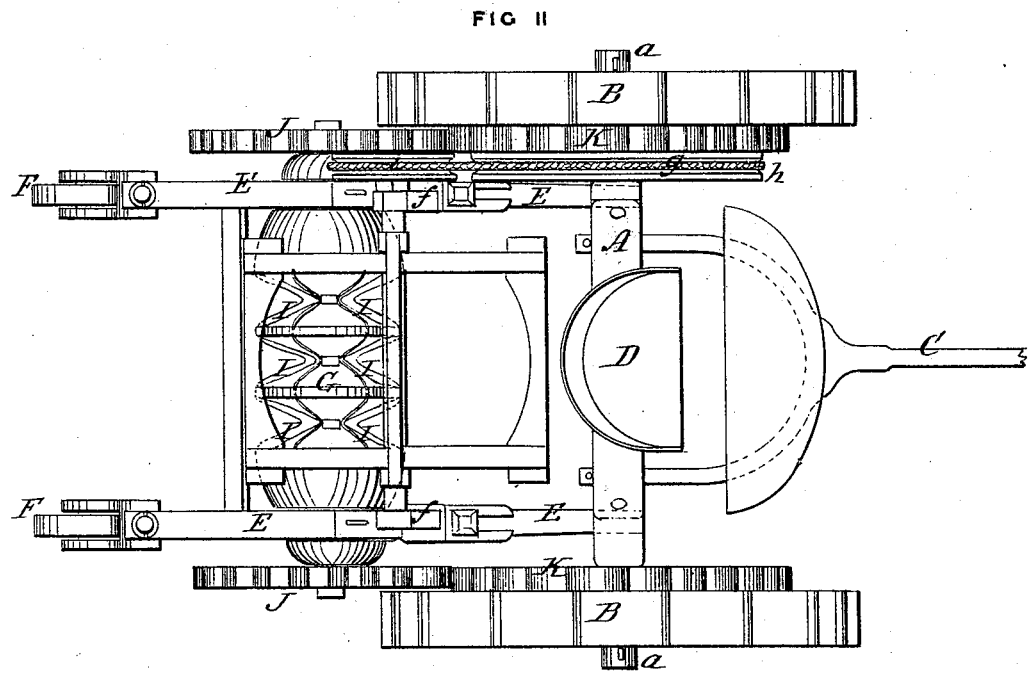
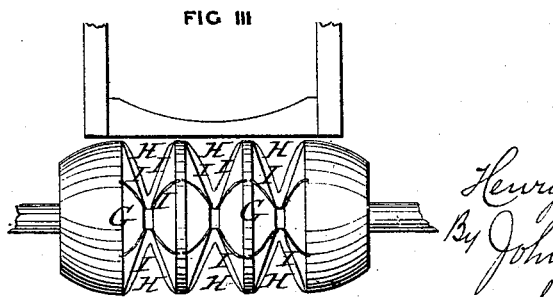
WITNESSES
John E. Laing.
J.H. Rutherford
INVENTOR
Henry Lee
By Johnson & Johnson
his Attys

UNITED STATES PATENT OFFICE.

HENRY LEE, OF MAHALASVILLE, INDIANA.

IMPROVEMENT IN COTTON-STALK PULLERS.

Specification forming part of Letters Patent No. 167,105, dated August 24, 1875; application filed June 11, 1875.

*To all whom it may concern:*

Be it known that I, HENRY LEE, of Mahalasville, in the county of Morgan and State of Indiana, have invented certain new and useful Improvements in Cotton-Stalk Pullers; and I do hereby declare that the following is a full, clear, and exact description thereof, which will enable others skilled in the art to which it pertains to make and use the same, reference being had to the accompanying drawing, and to the letters of reference marked thereon, which form a part of this specification.

The object of the present invention is to provide for public use a machine for pulling cotton and other stalks in the field, which shall effectually perform its work, and be simple in construction.

The invention consists essentially in the provision of a revolving pulling-shaft or cylinder, which is designed to act upon a series of stalks at the same time, and is constructed with circumferential angular grooves, in which are located obliquely-arranged biting wings or plates, each pair of wings located, respectively, on opposite sides of the grooves in the cylinder, being so arranged that an angular or V-shaped notch is formed between them, which receives the stalk, and tends to draw or pull the same out of the ground when the cylinder is revolved; and in combination therewith I employ a revolving reel, located in advance and above the same, for the purpose of pressing down the stalks, presenting them properly to the action of the pulling-shaft and holding them while being pulled.

In the accompanying drawings, Figure 1 represents a vertical longitudinal section of a cotton-stalk puller embracing my invention; Fig. 2, a top view thereof; and Fig. 3, a detached view of the seizing and pulling device.

In the drawing, A denotes an arched axle or wheel frame, which is provided with horizontal spindles or journals $a$, for the reception of the transporting or ground wheels B. A tongue, C, is secured to the arched portion of the axle, for the attachment of the draft-team, and a driver's seat, D, is arranged above the axle. The stalk-pulling devices are mounted in an independent frame, E, the side bars of which are hinged to the axle A at their front ends, while the rear end of the frame is supported above the ground by means of caster or bearing wheels F, located thereat. Near the rear end of the frame E, or thereabout, there is located a transverse shaft or cylinder, G, which is journaled in the side bars of said frame, and is provided with circumferential grooves H. Said grooves are made wider at the periphery of the cylinder than at their inner terminations, and thus they are caused to present an angular form, their side walls being inclined.

The cylinder may be made solid, in which instance the grooves are formed or cut by means of suitable tools, but it is also proposed to form the grooved cylinder by means of separate or independent disks or collars fitted on a central shaft. At suitable intervals around the cylinder there are located biting wings or plates I, which are attached to the inner or inclined sides of the circumferential grooves. The wings or plates are arranged in longitudinal rows, and in pairs within each groove, so that an angular or V-shaped notch or space is left between each pair of plates by reason of the peculiar form of the cylinder or the grooves therein, and the relative arrangement of the plates or wings.

The pulling-shaft is revolved through the medium of spur-wheels J, at its ends, which gear into large spur-wheels K, affixed to the inner sides of the transporting-wheels, or to the hub of the same.

When the machine is drawn forward, the pulling-shaft or cylinder is rotated in a reverse direction to that in which the machine is traveling, and in its rotation the different biting-wings will successively seize and pull up the stalks which they encounter. The angular form of the notches between the biting-wings is eminently adapted to insure the proper grasping or holding of the stalks until they have been pulled out of the ground.

In order to press down the stalks, and to present them properly to the pulling-cylinder, there is employed for this and other purposes a revolving reel, L, which is arranged in advance of the pulling-cylinder, and at such a height above the same that the reel-arms will sweep over the periphery of the cylinder. The reel is journaled in standards $f$, rising from the frame E, and it is driven by means of an endless chain or band, g, and grooved wheels or pulleys h i. The reel in its rotation will knock down the stalks, and present them properly to the pulling-cylinder, the biting-wings of which will then firmly grasp and pull up the stalks by reason of the advancing movement of the machine, and oppositely or backwardly revolving motion of the pulling-shaft. The reel exerts the proper pressure upon the stalks while the same are being held by the biting-wings, and thus it will be impossible for the latter to release their hold or to fail in their pulling operation.

While the reel subserves important functions in connection with the pulling-cylinder, it may, in certain instances, be dispensed with, when the angular biting-wings and grooved cylinder are deemed to answer the purpose for which the machine is designed.

I claim—

1. In a field stalk-puller, the combination of a revolving pulling-cylinder, having circumferential angular grooves and biting and pulling wings located therein, with the revolving reel, substantially as herein described.

2. The combination, with the pulling-cylinder frame E, hinged to the axle, and supported by the casters F, of the gear-wheels J K, at each end of the cylinder and axle, as and for the purpose described.

In testimony that I claim the foregoing as my own I have affixed my signature in presence of two witnesses.

HENRY + LEE.
his
mark.

Witnesses:
F. P. A. PHELPS,
M. O. PIERCE.